Patented May 25, 1948

2,442,075

UNITED STATES PATENT OFFICE 2,442,075

PROCESS FOR BREAKING PETROLEUM EMULSIONS

Melvin De Groote, University City, and Arthur F. Wirtel, Glendale, Mo., assignors to Petrolite Corporation, Ltd., Wilmington, Del., a corporation of Delaware No Drawing. Application July 13, 1945, Serial No. 604,997

12 Claims. (Cl. 252—341)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

And still another object of our invention is to provide a new demulsifier for petroleum emulsions of the water-in-oil type.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent used in our herein described process for resolving petroleum emulsions, consists of an aminoalcohol ester derived by reaction between a hydroxylated tertiary amine, such as triethanolamine and the fractional ester derived by reaction between diglycollic acid and a basic acylated aminoalcohol in which there is at least one occurrence of the radical:

$$RCO.(OR')_nN<$$

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said compound in monomeric form being at least 243 and not over 4,000.

One may conveniently consider the new chemical products herein contemplated as a sub-generic specie of a broader class of materials described in our co-pending application of this same date, Serial No. 605,002, filed July 13, 1945. In our said co-pending application there is described an ester derived by reaction between diglycollic acid and a basic acylated amino-alcohol, in which there is at least one occurrence of the radical $$RCO.(OR')_nN<$$

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said compound in monomeric form being at least 243 and not over 4,000.

The preferred reagent in said aforementioned co-pending application, and particularly for use as a demulsifier, is the one in which there is present at least one free carboxylic radical, which carboxylic radical in turn is part of a diglycollic acid residue. If such an intermediate having a free diglycollic carboxyl is reacted with triethanolamine or the like, i. e., any hydroxylated basic tertiary amine, one obtains a specific type of amino alcohol ester which represents a sub-genus of the broad class described in our co-pending application Serial No. 605,002, filed July 13, 1945, but is in turn the genus of the herein described invention.

Obviously, the easiest procedure for the manufacture of the herein contemplated compounds is to prepare the acidic intermediates, as described in our co-pending application Serial No. 605,002, filed July 13, 1945; and then esterify such intermediates with triethanolamine or the equivalent tertiary amine which may be a monoamine or a polyamine. For this reason, the subject-matter immediately following is largely a repetition in verbatim form of what appears in our aforementioned co-pending application.

Thus, one reactant employed for the manufacture of the new demulsifier forming the subject-matter of our present application, consists of an ester derived by reaction between diglycollic acid and a basic acylated aminoalcohol, in which there is at least one occurrence of the radical $$RCO.(OR')_nN<$$

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said compound in monomeric form being at least 213 and not over 4,000. The aminoalcohols employed as primary raw materials have more than one amino radical, or, for that matter, more than one basic amino radical. Stated another way, the compounds herein contemplated are derivatives of esters of aminoalcohols, which may contain ether linkages, as well as more than one amino nitrogen atom.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, 2nd edition, page 253.)

Reference to an amine and the subsequent amino compounds, as final products, is intended to include the salts and the anhydro base, as well as the hydrated base, since both obviously are present when an aqueous system is being subjected to the reagent, or when the reagent is used as a water solution or dispersion. ("In an aqueous solution of the amine, the anhydro base, $R-NH_2$, the hydrated base, $R-NH_3-OH$, and the 2 ions are all present." Richter, s. v., page 252.)

As has been previously stated, the primary raw materials or intermediates contemplated for the production of the hereindescribed new demulsifier, are well known. For convenience and for the purpose of brevity, reference is made to the following three United States patents to De Groote and Keiser, to wit: Nos. 2,324,488, 2,324,489 and 2,324,490, all dated July 20, 1943. Said patents are concerned with processes for breaking water-in-oil emulsions.

As has been previously pointed out in our co-pending application Serial No. 605,002, filed July 13, 1945, we have described products obtained by reaction between diglycollic acid and acylated amino alcohols of the kind described in said three aforementioned patents immediately preceding.

A very important aspect of the invention described in our co-pending application is the particular type or variety wherein there is a residual carboxylic radical present, which represents part of the diglycollic acid residue. In the present instance we need do nothing more than employ the same aminoalcohols described collectively in the aforementioned three patents as being suitable for acylation and react such tertiary aminoalcohols, which must contain a hydroxyl radical, with the aforementioned fractional ester, thus producing the resultant which is herein contemplated as a new composition and as a demulsifying agent. Thus, said aminoalcohols must have present an alcoholiform hydroxyl as part of an acyl radical or as part of a substituent for an aminohydrogen atom. Thus, one may employ not only the aminoalcohols described in the three aforementioned United States patents, but also the obvious analogs in which there is no hydroxyl radical present. Subsequent reference will be made to this particular type and examples will be included.

Aforementioned U. S. Patent No. 2,324,488 describes hydroxylated acylated aminoether compounds containing:

(a) A radical derived from a basic hydroxyaminoether, and said radical being of the kind containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyaminoether radical being characterized by containing not more than 60 carbon atoms; and (b) An acyl radical derived from a detergent-forming monocarboxy acid having at least 8 carbon atoms and not more than 32 carbon atoms, said acylated aminoether being additionally characterized by the fact that said aforementioned acyl radical is a substituent for a hydrogen atom of an alcoholic hydroxyl radical.

Aforementioned U. S. Patent No. 2,324,489 describes hydroxylated acylated monoamino compounds free from ether linkages, said hydroxylated acylated amino compounds being of the following type:

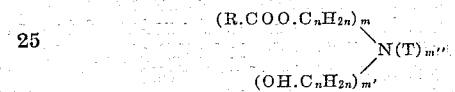

in which R.COO represents the oxyacyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1 or 2; and $m''$ represents the numeral 0, 1 or 2; with the proviso that $m$ plus $m'$ plus $m''=3$.

Aforementioned U. S. Patent No. 2,324,490 describes basic hydroxylated acylated polyamino compounds free from ether linkages, said compounds being the following formula:

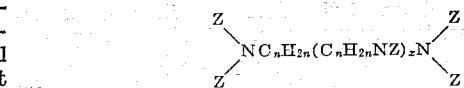

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 6 carbon atoms or less and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) Acyloxyalkylene radicals, in which the acyl group is RCO; and (b) Joint occurrence of an amino radical, in which the acyl group is RCO and a hydroxyalkyl radical.

A description of certain high molal monocarboxy acids, and more particularly, those commonly referred to as detergent-forming monocarboxy acids, appears in all three of the aforementioned U. S. Patents. For convenience, the following description is substantially a verbatim form of the same subject-matter as it appears in aforesaid U. S. Patent No. 2,324,490.

It is well known that certain monocarboxy organic acids containing 8 carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids, and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

We have found that the composition of matter herein described and employed as the intermediate in the manufacture of our new demulsifier, is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. Our preferred intermediate or raw material is obtained from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is a somewhat analogous class obtained by treating carbon dioxide or carbon monoxide, in the presence of hydrogen or an olefin, with steam, or by causing a halogenated hydrocarbon to react with potassium cyanide and saponifying the product obtained. Such products or mixtures thereof, having at least 8 and not more than 32 carbon atoms, and having at least one carboxyl group, or the equivalent thereof, are suitable as detergent-forming monocarboxy acids; and another analogous class equally suitable, is the mixture of carboxylic acids obtained by the alkali treatment of alcohols of high molecular weight formed in the catalytic hydrogenation of carbon monoxide.

As is well known, one need not use the high molal monocarboxy acid, such as a fatty acid, for introduction of the acyl group or acyloxy group. Any suitable functional equivalent, such as the acyl halide, the anhydride, ester, amide, etc., may be employed.

The intermediate or raw material employed in the manufacture of our new demulsifier consists of an aminoalcohol ester, as described; and particular attention is called to the fact previously noted, that such esterified aminoalcohol must contain a hydroxyl radical to permit reaction with diglycollic acid. Other aminoalcohol esters of the kind herein contemplated as reactants are described in U. S. Patent No. 2,259,704, dated October 21, 1941, to Monson and Anderson.

In light of what has been said, it hardly appears necessary to include a list of reactants and intermediates derivable therefrom. Thus, suitable tertiary amines which may be employed include the following: Triethanolamine, diethanolalkylamines, such as diethanolethylamine, diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolbenzyl dipropanolamine, tripentanolamine, trihexanolamine, hexyl diethanolamine, octadecyl diethanolamine, etc.

Additional amines include ethanol diethylamine, propanol diethylamine, ethanol dipropylamine, propanol dipropylamine, ethanol dicyclohexylamine, cyclohexanol diethanolamine, dibenzyl ethanolamine, etc. Ether type aminoalcohols may be obtained from the above mentioned aminoalcohols, for example, by treating them with one or more moles of an oxyalkylating agent, such as ethylene oxide, propylene oxide, butylene oxide, glycid, etc. It is to be noted that comparable products are obtained by treating primary or secondary amines, rather than arylamines with an olefine oxide. Primary or secondary amines which can be subjected to oxyalkylation include diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, octylethanolamine, octadecylethanolamine, pentanolamine, hexanolamine, octylethanolamine, dodecylethanolamine, cyclohexanolethanolamine, etc.

AMINOALCOHOL ESTER

*Example 1*

One pound mole of ricinoleic acid is reacted with one pound mole of triethanolamine at approximately 180° to 240° C. for approximately 10 to 25 hours, until there is substantially complete esterification. The composition of the formula of such product is indicated by the following formula in which OH.RCO is the ricinoleyl radical:

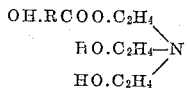

$$\begin{matrix} OH.RCOO.C_2H_4 \\ HO.C_2H_4\!-\!\!N \\ HO.C_2H_4 \end{matrix}$$

AMINOALCOHOL ESTER

*Example 2*

Ricinoleic acid in the preceding example is replaced by methyl naphthenate.

AMINOALCOHOL ESTER

*Example 3*

Methyl abietate is substituted for ricinoleic acid in Example 1, preceding.

AMINOALCOHOL ESTER

*Example 4*

Ethyl oleate is substituted for ricinoleic acid in Example 1.

AMINOALCOHOL ESTER

Example 5

One pound mole of triethanolamine is reacted with one pound mole of ethylene oxide and the etherized amine so obtained is substituted for triethanolamine in Examples 1 to 4, preceding.

AMINOALCOHOL ESTER

Example 6

One pound mole of triethanolamine is reacted with two pound moles of ethylene oxide and the etherized amine so obtained is substituted for triethanolamine in Examples 1 to 4, preceding.

AMINOALCOHOL ESTER

Example 7

One pound mole of triethanolamine is reacted with three pound moles of ethylene oxide and the etherized amine so obtained is substituted for triethanolamine in Examples 1 to 4, preceding.

AMINOALCOHOL ESTER

Example 8

One pound mole of triethanolamine is reacted with 4 to 6 pound moles of ethylene oxide and the etherized amine so obtained is substituted for triethanolamine in Examples 1 to 4, preceding.

AMINOALCOHOL ESTER

Example 9

One pound mole of diethanol amylamine obtained by reacting one pound mole of amylamine with two pound moles of ethylene oxide, is employed in place of triethanolamine in Examples 1 to 4, preceding.

AMINOALCOHOL ESTER

Example 10

The same procedure is employed as in the preceding example, except that an etherized amine is obtained by treating amylamine with 4, 6 or 8 moles of ethylene oxide and such etherized amine is employed instead of diethanol amylamine.

AMINOALCOHOL ESTER

Example 11

One pound mole of castor oil is reacted with 3 pound moles of triethanolamine, as described in aforementioned U. S. Patent No. 2,324,489, under the heading "Intermediate hydroxylated amine, Example 1."

AMINOALCOHOL ESTER

Example 12

The same procedure is followed as in the preceding example, except that either one pound mole or two pound moles of glycerol are added to the reaction mass consisting of one pound mole of castor oil and three pound moles of triethanolamine.

AMINOALCOHOL ESTER

Example 13

The resultants obtained in Examples 1 to 4, preceding, are treated with equal molal ratios of an olefine oxide, having less than 5 carbon atoms.

AMINOALCOHOL ESTER

Example 14

One follows the directions of U. S. Patent No. 2,293,494 to De Groote and Keiser, dated August 18, 1942, to produce an amine of the following composition:

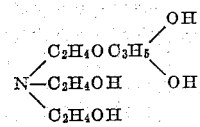

Such amine is substituted for triethanolamine in the preceding examples.

AMINOALCOHOL ESTER

Example 15

One pound mole of hydroxyethyl ethylenediamine is reacted with 3 moles of ethylene oxide to give the corresponding tetrahydroxylated derivative. Such compound is employed in place of triethanolamine in the preceding examples.

AMINOALCOHOL ESTER

Example 16

The same procedure is followed as in the preceding example, except that 4 to 7 moles of ethylene oxide are employed instead of 3 moles.

AMINOALCOHOL ESTER

Example 17

The same procedure is employed as in the preceding example, except that diethylenetriamine is substituted for ethylenediamine, and treated in such a manner as to eliminate any secondary amino radicals.

AMINOALCOHOL ESTER

Example 18

Amines of the following composition:

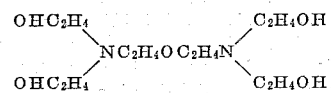

and

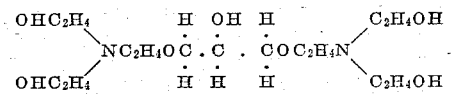

are substituted for ethylenediamine in the preceding examples.

AMINOALCOHOL ESTER

Example 19

In the preceding examples, where more than one high molal acyl radical can be employed, two ricinoleyl radicals or the equivalent are introduced into the polyamine alcohol.

AMINOALCOHOL ESTER

Example 20

Unsymmetrical diphenyl diethylenetriamine is treated with ethylene oxide and substituted for oxyethylated ethylenediamine in the preceding examples.

AMINOALCOHOL ESTER

Example 21

Symmetrical diacetyl triethylenetetramine is treated with 4 moles of ethylene oxide and substituted for oxyethylated ethylenediamine in the preceding examples.

AMINOALCOHOL ESTER

Example 22

Additional examples are prepared in the manner previously described, except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3 propanediol; tris(hydroxymethyl)aminomethane; or piperidine. One may use enough of the olefine oxide, for instance, ethylene oxide, to convert all amino hydrogen atoms into hydroxyethyl radicals, or one may employ a greater amount so as to introduce ether linkages in addition, or may use glycide instead of ethylene oxide, at least to introduce a terminal radical or radicals having a plurality of hydroxyl groups.

AMINOALCOHOL ESTER

Example 23

The same procedure is followed as in Example 22, preceding, except that one employs the amines described in Examples 9, 10, 11 and 13 of U. S. Patent No. 2,306,329, to De Groote and Keiser, dated December 22, 1942.

AMINOALCOHOL ESTER

Example 24

Soyabean oil, blown soyabean oil, blown castor oil, or blown teaseed oil is substituted for castor oil in the preceding examples.

In the above examples it is obvious that free hydroxyl radicals may be present as part of a hydroxyalkyl radical, or as part of the acyl radical of a fatty acid, such as ricinoleic acid.

As an example of a preferred type of raw material which is effective for use in preparing our new composition and demulsifier, the following is submitted: We prepared a mixture of diamine and triamine materials which correspond essentially to either one of the two following type forms:

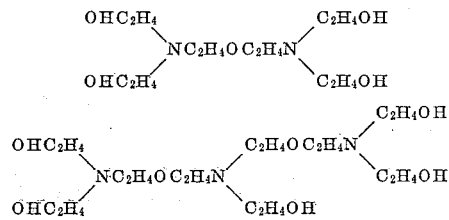

After determining the average molecular weight of such a mixture, we combine the same with castor oil in the proportion of one pound mole of castor oil for 3 pound moles of the mixed amines, "pound mole" in the latter case being calculated on the average molecular weight as determined. Such mixture is heated to approximately 160°-260° C. for approximately 6 to 25 hours, until reaction is complete, as indicated by the disappearance of all of the triricinolein present in the castor oil.

Having obtained aminoalcohol esters of the kind previously described, such products are reacted with diglycollic acid in varying proportions, and particularly in proportions which employ more than one mole of diglycollic acid for each mole of aminoalcohol ester. This procedure yields an acidic fractional ester which is then reacted further with triethanolamine or the like. The manufacture of the herein contemplated intermediate compounds is comparatively simple and involves nothing more or less than esterification, as differentiated from salt formation. For instance, a basic aminoalcohol ester might be combined with diglycollic acid so as to produce a salt. Such type of material is not herein contemplated, except to the extent that it is incidental to the formation of an ester. Aminoalcohol esters of the kind herein contemplated as reactants for esterification with diglycollic acid have been combined in similar forms with other dibasic acids, particularly phthalic acid in the form of the acid, anhydride, ester, etc. Similarly, in the present instance, one uses diglycollic acid in the same way that phthalic acid, maleic acid and tartaric acid would be employed. For complete description of such procedure, reference is made to U. S. Patent No. 2,154,422, dated April 18, 1939, to De Groote, Keiser and Blair.

In the preparation of esterification products, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent such as xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas, such as nitrogen or $CO_2$. Generally speaking, however, the reactions take place rapidly, quickly, and completely, by simply heating substances to enter into the reaction in desired stoichiometric proportions at a temperature above the boiling point of water, usually between about 180°–250° C. provided there is no decomposition. The most desirable products are obtained by combinations in which the ratio of moles of diglycollic acid to moles of particular material reacting therewith is within the ratios of 1 to 3 and 3 to 1.

Esterification reactions of the kind contemplated are used for the production of a wide variety of esters, resinous materials, sub-resinous materials, and include plasticizers. Attention is directed to the following patents which are a cross-section of conventional esterification procedure which can be applied in any instance to the production of the herein contemplated esters.

British Patent No. 422,845, Jan. 14, 1935
British patent to Eckey, No. 500,765, Feb. 15, 1939
U. S. patent to—
    Malm, No. 2,170,030, Aug. 22, 1939
    Bradley, No. 2,166,542, July 18, 1939
    Barrett, No. 2,142,989, Jan. 10, 1939
    Frazier, No. 2,075,107, Mar. 30, 1937
    Sly, No. 2,073,031, Mar. 9, 1937
    Bradley, No. 1,951,593, May 20, 1934
    Lawson, No. 1,909,196, May 16, 1933
    Kessler, No. 1,714,173, May 21, 1929
    Van Schaack, No. 1,706,639, Mar. 26, 1929
    Jones, No. 2,264,759, Dec. 2, 1941
    Wietzel, No. 1,732,392, Oct. 22, 1929
    Groves et al., No. 1,993,738, Mar. 12, 1935

Attention is directed to a comprehensive article entitled "Polyhydric alcohol esters of fatty acids, their preparation, properties and uses," by H. A. Goldsmith, in Chemical Reviews, volume 33, December 1943, No. 3.

ACIDIC FRACTIONAL ESTER

Example 1

One pound mole of an aminoalcohol ester, as described under the heading "Aminoalcohol ester, Example 1" is reacted with one pound mole of diglycollic acid. This is a conventional esterification reaction and the materials are mixed and heated to approximately 180°–250° C., with constant stirring until samples taken from the batch and analyzed show substantially complete disappearance of a hydroxyl value equivalent to combination with one carboxyl radical of the diglycollic acid. The time may vary from 2 to 14 hours. A suitable solvent may be present and any water formed may be distilled off continuously during the esterification reaction.

ACIDIC FRACTIONAL ESTER

*Example 2*

The same procedure is followed as in the preceding example, except that 2 pound moles of diglycollic acid are used for each pound mole of the aminoalcohol ester. The time of reaction may have to be increased moderately.

ACIDIC FRACTIONAL ESTER

*Example 3*

The same procedure is followed as in Example 1, except that 2¼ pound moles of diglycollic acid are employed instead of 1 pound mole as in the previous example. The time of reaction may have to be increased moderately and the temperature of reaction increased slightly.

ACIDIC FRACTIONAL ESTER

*Example 4*

An aminoalcohol ester is prepared in the manner described under the heading "Aminoalcohol ester, Example 11," preceding, and the resultant product is assumed to represent the formation of 3 pound moles of an aminoalcohol ester. Such 3 pound moles of the aminoalcohol ester so formed are treated in the manner described in the three examples preceding, that is, with 3 moles of diglycollic acid, six moles of diglycollic acid, and 6¾ moles of diglycollic acid.

ACIDIC FRACTIONAL ESTER

*Example 5*

The same procedure is employed as in Example 4, except that the 3 moles of aminoalcohol ester is obtained by reaction involving 1 pound mole of castor oil and 6 pound moles of triethanolamine. The resultant, considered as representing 3 pound moles, is reacted with 3 pound moles, 6 pound moles and 6¾ pound moles of diglycollic acid.

ACIDIC FRACTIONAL ESTER

*Example 6*

The same reactant employed as in Example 5, preceding, is reacted with 7½ pound moles of diglycollic acid.

ACIDIC FRACTIONAL ESTER

*Example 7*

The same procedure is followed as in Examples 5 and 6, immediately preceding, except that the aminoalcohol ester is obtained by reaction involving 1 pound mole of castor oil and 9 pound moles of triethanolamine.

ACIDIC FRACTIONAL ESTER

*Example 8*

An aminoalcohol ester prepared from ricinoleic acid or ethyl ricinoleate in the manner described under the heading "Aminoalcohol ester, Example 14" is substituted for the product exemplified by "Aminoalcohol ester, Example 1" in "Acidic Fractional Ester, Example 1," preceding.

ACIDIC FRACTIONAL ESTER

*Example 9*

One pound mole of an amine of the following composition:

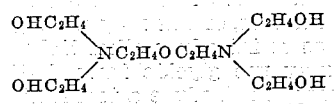

(see Aminoalcohol ester, Example 18, preceding) is reacted with 1 pound mole of ricinoleic acid or ethyl ricinoleate and the aminoalcohol ester so obtained reacted with 1, 2, 2¼ and 3 pound moles of diglycollic acid for each pound mole of the aminoalcohol ester.

ACIDIC FRACTIONAL ESTER

*Example 10*

One pound mole of an amine of the following composition:

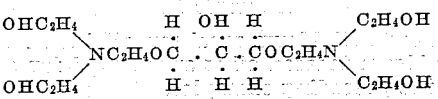

(see Aminoalcohol ester, Example 18, preceding) is reacted with one pound mole of ricinoleic acid or ethyl ricinoleate and the aminoalcohol ester so obtained reacted with 1, 2, 2¼ and 3 pound moles of diglycollic acid for each pound of the aminoalcohol ester.

ACIDIC FRACTIONAL ESTER

*Example 11*

One pound mole of an amine of the following composition:

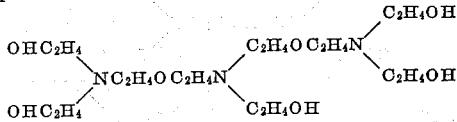

(see Aminoalcohol ester, Example 24, preceding) is reacted with 1 pound mole of ricinoleic acid or ethyl ricinoleate and the aminoalcohol ester so obtained reacted with 1, 2, 2¼ and 3 pound moles of diglycollic acid for each pound mole of the aminoalcohol ester.

It may be well to point out that the amino compounds herein contemplated for reaction with diglycollic acid, may be monoamino or polyamino in type. There must be at least one free hydroxyl radical present. There must be present at least one occurrence of the radical

in which RCO is the acyl radical of a monocarboxy detergent-forming acid having at least 8 and not more than 32 carbon atoms, and the amino nitrogen atom must be basic, i. e., free from direct linkage with an unsaturated or negative radical, such as an acyl radical, or an aryl radical. The R' is an alkylene radical having at least 2 and not more than 10 carbon atoms, and preferably, 2, 3 or 4 carbon atoms. The alkylene radical may be considered as being derived from an olefine oxide, such as those previously mentioned. Additional reactive olefine oxides are described in U. S. Patent No. 2,208,581, to Hoeffelman, dated July 23, 1940, and include, among others, glycide, hexylene oxide, decene oxide, etc. The character $n$ indicates a number varying from 1 to 10, but preferably, from 1 to 4. Recurrences of R' need not be the same. For instance, one mole of triethanolamine might be reacted with 3 moles of ethylene oxide, and the resultant product so obtained may be reacted with 3 moles of butylene oxide. The aminoalcohol so obtained could be esterified in the manner previously described. It is obvious, of course, that where $n$ is 2 or more, the product is in essence an esterified aminoetheralcohol, the expression "etheralcohol" being frequently applied to alcohols where a carbon atom chain is interrupted at least once by an oxygen atom. Ether linkages may appear in other positions where there is no direct union with RCO.

The simplest reactant herein contemplated is the octenoic acid ester of diethanolmethylamine. On the other hand, one may have amino compounds having 4, 5 or 6, amino nitrogen atoms and containing in addition as many as 4 acyl radicals derived from high molal acids having as many as 32 carbon atoms. Thus, the molecular weight range of the monomeric form may vary from 243 to 10 or 20 times such value, or just short of 5,000 or thereabouts. The ease with which heat polymerization of polyhydric alcohols and polyhydric aminoalcohols takes place suggests that condensation polymers obtained by etherization may have a substantially higher molecular weight.

Reference has been made to the use of glycide, epichlorhydrin, etc., as an oxyalkylating agent. Reference has also been made to reactions which involve etherization in which glycerol appears as a reactant. Thus, R', previously referred to as being an alkylene radical, such as ethylene, propylene, etc., obviously includes radicals obtained from glycerol or glycide, i. e., the hydroxy propylene radical. Hence, in the hereto appended claims, reference to the propylene radical, either generally or specifically, is intended to include the hydroxy propylene radical as well.

Attention is directed to the fact that in the hereto appended claims, the proviso that an ether linkage be present does not mean that the ether linkage must necessarily occur in the radical by which the acyl radical RCO is joined to the nearest basic nitrogen atom. For instance, compare the last two previous formulae preceding (Acidic fraction ester, Examples 10 and 11), and note that the introduction of an acyl radical is such that the acyloxy radical is joined to, or united to, a basic amino nitrogen atom by an uninterrupted carbon atom chain. Thus, reference in the hereto appended claims to an ether radical includes both types of ether linkages, i. e., the type where the ether linkage is part of the radical linking RCO to the nearest basic amino nitrogen atom, and in such instances where the ether radical does not represent part of the linking radical which unites RCO to the nearest basic amino nitrogen atom, but involves a radical uniting two nitrogen atoms.

At this point it may be well to re-emphasize the nature of the compounds herein contemplated, the most expedient method of manufacture and the preferred form which represents in fact an invention within an invention. The first step involves the production of an acylated amino alcohol in which there is present a high molal acyloxy radical, as defined, and also an alcoholic hydroxyl radical. There must be present at least one basic amino radical, and there may be present more than one basic amino radical. Such reactant obtained from the specified raw materials is esterified with diglycollic acid, so as to yield a fractional ester having present one or more free carboxyl radicals as part of a diglycollic acid group. We have found that the best results are obtained from: triethanolamine, heat polymerized triethanolamines, and polymerization products of triethanolamines and glycerol. These are typified by the following three formulae previously presented:

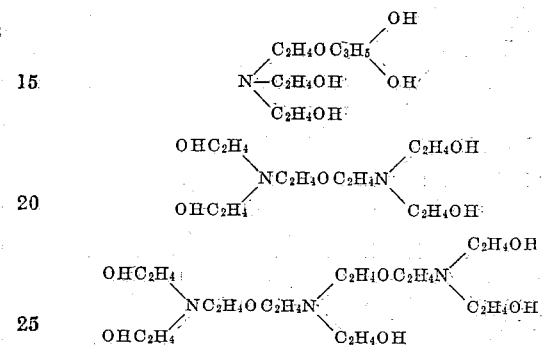

The acyloxy group is preferably obtained from an unsaturated higher fatty acid having 18 carbon atoms and particularly castor oil. Such compounds described from the above reactants along with the etherization derivatives of the two polyamines, in combination with glycerol and employing ricinoleic acid as the higher fatty acid group, give intermediates of outstanding merit. Such intermediates, after combination with diglycollic acid, yield products, which will then esterify, as hereinafter described, with triethanolamine to give new compositions or compounds. These intermediates are used for many purposes, particularly demulsification, and are most readily and most economically prepared.

Although the acidic fractional ester is combined with triethanolamine under conditions which primarily promote esterification, there is also reason to believe that etherification of such triethanolamine group, with other ethanol radicals, can and does take place, especially as a secondary reaction under drastic conditions of reaction, as compared with milder conditions of reaction. These variations in reaction conditions are hereinafter described.

Returning to a consideration of the reactants employed in obtaining the present composition, it is to be noted that in some instances condensation polymerization can take place insofar that both reactants are polyfunctional. This is not necessarily the case in each instance, as, for example, the aminoester obtained by reaction of ricinoleic acid and diethyl ethanolamine or oleic acid and ethyl diethanolamine.

What has been said in the paragraph immediately preceding is concerned with the acidic fractional ester which is considered as an intermediate. Further consideration of the resinous or sub-resinous nature of the intermediate will be considered further in subsequent paragraphs. It should be noted, however, that the hydroxylated tertiary amine, particularly if polyhydroxylated, which happens to be the case in the instance of the preferred reactant triethanolamine, tends to further increase the molecular weight or the resinous or sub-resinous nature of the final product.

On the other hand, where one of the reactants is an esterified aminoalcohol derived from aminoalcohols of the kind described by formulae in "Aminoalcohol esters, Examples 1, 14 and 17," it is obvious that reaction with a dicarboxy acid, such as diglycollic acid, can produce resinous or sub-resinous products. In many instances such sub-resinous or balsam-like products are really the most desirable of all, but they probably do not represent any large degree of polymerization. In other words, the structural units may appear 3 or 4 times over, and in substantially every instance, the molecular weight is distinctly less than 5,000, with perhaps 3,000 as an average figure. Otherwise stated, such polymers consist largely of dimers, trimers, tetramers, pentamers, hexamers, etc., having molecular weights, by the ordinary melting point depression methods, of less than 5,000. It is also obvious that polymerization may be due to this formation of new ether linkages, as well as esterification. In order to produce such sub-resinous low multiple polymers, one need only continue the time of reaction, or use a somewhat increased temperature of reaction, provided the esterified aminoalcohol offers opportunity for condensation polymerization by either esterification or etherization.

In light of what has been said, it becomes obviously difficult, if not impossible, to present a formula depicting such more elaborate and more complicated aspect of the invention, i. e., a formula which would describe the low multiple polymer, as well as the monomer. However, insofar that such polymer is essentially a repetition of the structural unit with only a comparatively small change, such as one expects in condensation polymerization, it is intended that the claims hereto appended contemplate in the broadest aspect both the monomers and the polymers.

It is our preference to employ intermediates, wherein there is an excess of unreacted diglycollic acid radicals compared with basic amino nitrogen atoms. By proper selection of ratio of reactants, one may, of course, have a type of ester which is alkaline in nature, that is, has more basic amino nitrogen atoms present than in esterified diglycollic carboxyl radicals. Similarly, one may have a neutral salt form where the number of basic amino nitrogen atoms is just equal to the number of free diglycollic acid radicals, and finally one may have the acidic form where the number of free diglycollic acid radicals is greater than the number of basic amino nitrogen radicals. In this connection attention is directed to the structural formulae of the aminoalcohols depicted in "Aminoalcohol ester, Examples 14 and 18." In each instance one could introduce at least one acyl group, particularly a hydroxyl acyl group, such as the ricinoleyl radical, and still introduce sufficient diglycollic acid radicals, so that the free radicals resulting from the combination of only one of the two diglycollic acid radicals would be in excess of the number of amino nitrogen atoms present. Our preferred form of reagent is the one which shows either basic properties or acidic properties, preferably the latter. Another type which is particularly valuable is the type in which both free carboxylic radicals and hydroxyl radicals are present. Such type is apt to appear in the polymers previously described. It is also evident that if unreacted, a carboxyl radical and the basic amino nitrogen residue may cause inner salt formation to take place and may also be responsible for the formation of miscells when the herein contemplated compounds are used under such conditions in which effectiveness is related to surface activity.

The preferred reagents herein contemplated represent monomers of low multiple polymers derived from castor oil and the cheapest hydroxylated tertiary amine, to wit, triethanolamine. In monomeric form, the resultant of such reactions involving, for instance, one mole of ricinoleic acid, 2, 3 or 4 moles of triethanolamine and even a mole of glycerol, is still distinctly under a thousand, and even if the monomeric unit adds several diglycollic acid radicals, yet after allowing for the elimination of water in the condensation polymerization, it becomes obvious that low multiple condensation polymers will not exceed a molecular weight of 5,000. After reaction with triethanolamine or the like, the resultant or composition of matter may have an even higher molecular weight, for reasons indicated.

A rather complete description of esterification involving particularly the carboxyl radical of diglycollic acid and a hydroxylated compound containing a basic group has been presented previously. Specific examples of such esterification involving a diglycollic acid carboxyl and a hydroxylated compound containing a basic group have been included as for example in the illustration identified as "Acidic fractional ester, Example 1." Obviously, the further esterification of a residual diglycollic acid radical with a basic hydroxylated reactant as contemplated involves merely the same esterification procedure as has been pointed out previously and being in essence a procedure involving a temperature above the boiling point of water and below the point where destructive decomposition of the reactants begins. Furthermore, esterification as such can be measured in either one or two ways, the amount of water evolved or the reduction in carboxyl acidity by esterification. The conditions previously suggested in regard to temperature, to wit, 180–250° C. and the time period of 2 to 14 hours are perfectly satisfactory because both esterifications are essentially the same sort of reactions, i. e., involving a diglycollic acid carboxyl and a basic hydroxylated compound.

COMPOSITION OF MATTER

*Example 1*

An acidic fractional ester is prepared in the manner exemplified by Example 3, preceding. In the preparation of the fractional ester, the reaction is stopped when there are approximately an average of 2¼ free carboxyls per structural unit. To two moles of the product so obtained, there is added one mole of triethanolamine. Possibly and probably, under the more drastic conditions, water of etherification is also lost. It is to be noted that if the triethanolamine acts as a trihydric alcohol, that it can unite with approximately two-thirds of the free carboxyl radicals present, and thus, the final product is characterized by the presence of some free carboxyl radicals, notwithstanding the fact that there is present an added basic amino nitrogen atom in the sub-resinous material so obtained. Our experience is, however, that the acidity does correspond exactly to such stoichiometric relationship, and this may be explained by the fact that some etherization of the triethanolamine takes place during the reaction, but in any event, at least sufficient reaction takes place so that the triethanolamine added, whether as such or as an etherized form, becomes ester-linked or ether-linked to the fractional ester previously described. Although the nature of the reaction and the chemical structure of the resultants are not susceptible to usual identification, yet the two products, i. e., the fractional ester, prior to its reaction with triethanolamine or its equivalent and the resultant of the reaction, may act entirely differently on various petroleum emulsions. We are aware of instances where the resultant has been at least twice as effective a demulsifier as the acidic fractional ester prior to reaction. The final product has a dark amber subresinous appearance, particularly when prepared in an iron or steel reaction vessel.

COMPOSITION OF MATTER

Example 2

The same procedure is followed as in Example 1, preceding, except that the aminoalcohol ester, which is converted into the acidic fractional ester, is the kind exemplified by "Aminoalcohol ester, Example 5, 6, 7 or 8," instead of "Aminoalcohol ester, Example 1," which was used as the raw material for the preparation of "Acidic fractional ester, Example 3."

COMPOSITION OF MATTER

Example 3

The same procedure is followed as in Example 1, preceding, except that the acidic fractional ester employed is the kind exemplified by "Acidic fractional ester, Example 4," in which 6¾ moles of diglycollic acid are employed.

COMPOSITION OF MATTER

Example 4

The same procedure is followed as in Example 1, preceding, except that the acidic fractional ester employed is the kind exemplified by "Acidic fractional ester, Example 5," in which 6¾ moles of diglycollic acid are employed.

COMPOSITION OF MATTER

Example 5

The same procedure is followed as in Example 1, preceding, except that the acidic fractional ester employed is the kind exemplified by "Acidic fractional ester, Example 7," in which 6¾ moles of diglycollic acid for each pound mole of castor oil originally employed in preparation of the aminoalcohol ester.

COMPOSITION OF MATTER

Example 6

The acidic fractional ester exemplified by Example 9 and obtained by the employment of 2¼ moles of diglycollic acid, is reacted with triethanolamine in the manner described in Example 1, preceding.

COMPOSITION OF MATTER

Example 7

The acidic fractional ester exemplified by Example 10 and obtained by the employment of 2¼ moles of diglycollic acid, is reacted with triethanolamine in the manner described in Example 1, preceding.

COMPOSITION OF MATTER

Example 8

The acidic fractional ester exemplified by Example 11 and obtained by the employment of 2¼ moles of diglycollic acid, is reacted with triethanolamine in the manner described in Example 1, preceding.

COMPOSITION OF MATTER

Example 9

Tripropanolamine is substituted for triethanolamine in the preceding examples. This iso form is most readily available.

COMPOSITION OF MATTER

Example 10

Tributanolamine is substituted for triethanolamine in Examples 1 to 8, preceding.

COMPOSITION OF MATTER

Example 11

Examples of tertiary hydroxylated amines such as triethanolamine, tripropanolamine, tributanolamine, etc., which have been treated with three, six or nine moles of ethylene oxide or some other oxyalkylating agent are substituted for the unetherized amines in Examples 1 to 10, preceding. (See "Aminoalcohol ester, Examples 5, 6, 7 and 8.")

COMPOSITION OF MATTER

Example 12

In Examples 1 to 8, preceding, triethanolamine is replaced by three-fourths its stoichiometric ratio of an amine of the following composition which has been previously described:

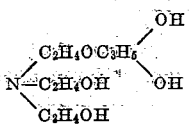

COMPOSITION OF MATTER

Example 13

In Examples 1 to 8, preceding, triethanolamine is replaced by three-fourths its stoichiometric ratio of an amine of the following composition which has been previously described:

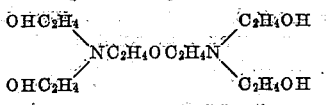

COMPOSITION OF MATTER

Example 14

In Examples 1 to 8, preceding, triethanolamine is replaced by three-fifths its stoichiometric ratio of an amine of the following composition, which has been previously described:

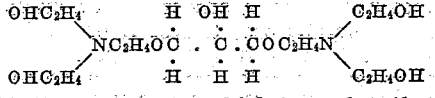

The type of material which is used as the preferred reactant has been previously pointed out, to wit, monomers or low multiple polymers derived from castor oil and the cheapest hydroxylated tertiary amine, to wit, triethanolamine. Such product is then treated with a plurality of diglycollic acid so as to yield the cheapest polydiglycollate having free carboxyl radicals. The preferred composition in the present instance again employs triethanolamine as the tertiary hydroxylated amine, and previous examples exemplify this preferred type of material.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be empoyed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. Indeed, solubility in the ordinary sense may be meaningless under such circumstances. This same fact is true in regard to the material or materials employed as the demulsifying agent of our process.

We desire to point out that the superiority of the reagent or demulsifying agent contemplated in our herein described process for resolving petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier into contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as it is concerned with demulsification of petroleum emulsions of the water-in-oil type, is concerned with the admixture of the esters or compounds, as described, with a viscosity-reducing solvent such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier selected to give a solution or mixture, particularly adaptable for proportional pumps or other measuring devices. The following examples will illustrate this aspect of our invention:

DEMULSIFIER

*Example 1*

|  | Per cent |
|---|---|
| Composition of matter, as exemplified by Example 3 | 60 |
| Xylene | 20 |
| Isopropyl alcohol | 20 |

DEMULSIFIER

*Example 2*

|  | Per cent |
|---|---|
| Composition of matter, as exemplified by Example 4 | 70 |
| Cresylic acid | 20 |
| Denatured alcohol | 10 |

DEMULSIFIER

*Example 3*

|  | Per cent |
|---|---|
| Composition of matter, as exemplified by Example 5 | 45 |
| Aromatic petroleum solvent | 20 |
| Isobutyl alcohol | 20 |
| Acetone | 15 |

DEMULSIFIER

*Example 4*

|  | Per cent |
|---|---|
| Composition of matter, as exemplified by Example 6 | 60 |
| Aromatic petroleum solvent | 10 |
| Denatured alcohol | 10 |
| Acetone | 20 |

(The above proportions represent percentage by weight.)

The results obtained with the herein contemplated compounds give results which are absolutely unexpected and unlooked-for, in light of the demulsifying action of other compounds of apparently analogous structure. For instance, it is conventional practice to use fractional esters derived from triricinolein or other esters, as herein described as reactants, in combination with other dicarboxy acids, such as phthalic acid, maleic acid, malic acid, citraconic acid, acelaic acid, adipic acid, etc. On numerous emulsions the diglycollic acid derivatives have given results which are simply outstanding, in comparison with such other analogous partial esters. In other words, it appears that for some unexpected reason, the ether grouping of diglycollic acid, in combination with the carboxylic radicals and the remainder of the molecule, give some exceedingly

FIELD TEST No. 1

On an oil-producing property located in the McFaddin field, at or near McFaddin, Texas, the emulsion produced contained approximately 20% of emulsion and water. The emulsion broke readily at 70° F., using a demulsifier corresponding substantially to Example 1, preceding. The residual oil contained a total of one tenth percent emulsion or water. The total time involved, both in mixing and settling, was one hour. The ratio of demulsifier used, on the basis of barrels of recovered oil, was 1 to 5,000. All told, such results represent an improvement of at least 40% over the next best available compound of the same structure, but obtained from some other dibasic acid, such as phthalic, maleic, adipic, etc., instead of diglycollic, notwithstanding the fact that this latter series of comparative tests were conducted at 30° F. higher in temperature.

FIELD TEST No. 2

On an oil-producing property located in the Placedo Field, at or near Placedo, Texas, the emulsion produced contained approximately 25% of emulsion and water. The emulsion broke readily at 70° F., using a demulsifier corresponding substantially to Example 1, preceding. The residual oil contained a total of two tenths percent emulsion or water. The total time involved, both in mixing and settling, was one hour. The ratio of demulsifier used, on the basis of barrels of recovered oil, was 1 to 10,000. All told, such results represent an improvement of at least 25% over the next best available compound of the same structure, but obtained from some other dibasic acid, such as phthalic, maleic, adipic, etc., instead of diglycollic.

FIELD TEST No. 3

On an oil-producing property located in the South Government Wells, at or near Duvol, Texas, the emulsion produced contained approximately 20% of emulsion and water. The emulsion broke readily at 100° F., using a demulsifier corresponding substantially to Example 1, preceding. The residual oil contained a total of one tenth percent emulsion or water. The total time involved, both in mixing and settling, was one hour. The ratio of demulsifier used on the basis of barrels of recovered oil, was 1 to 20,000. All told, such results represent an improvement of at least 40% over the next best available compound of the same structure, but obtained from some other dibasic acid, such as phthalic, maleic, adipic, etc. instead of diglycollic, notwithstanding the fact that this latter series of comparative tests were conducted at 30° F. higher in temperature.

It has been previously pointed out that one of the reactants herein employed, to wit, the resultant of a reaction between an acylated aminoalcohol and diglycollic acid may be sub-resinous in nature and may contain unreacted hydroxyl radicals, either as part of an acyl radical, such as a part of a ricinoleyl radical, or else, as part of a triethanolamine radical or the like, but in any event, each of such monomeric units must contain a plurality of unreacted diglycollic acid radicals, and thus, may be considered as a polycarboxy acid.

On the other hand, the hydroxylated tertiary amines herein employed for production of the acylated aminoalcohol, may also be employed as reactants for combination with the polycarboxy reactant just described. It will be recalled that the list of suitable tertiary amines previously enumerated for reaction in the manufacture of aminoalcohols, includes those having a single hydroxyl radical or a plurality of hydroxyl radicals. Thus, such aminoalcohols employed as reactants includes such capable of acting as monohydric alcohols or polyhydric alcohols.

In the instant case, the situation becomes even more complicated by the fact that, as has been pointed out, etherification may take place, as well as esterification. However, this does not detract from the viewpoint or considerating the polymeric resultant as a resin or sub-resin of the polyester type, for the reason that etherification may be considered as a combination of two polyhydric alcohols to produce a larger polyhydric alcohol with the elimination of water.

If an alcohol is indicated by the formula:

where $n$ indicates the number 2 or more, and if diglycollic acid be indicated for convenience by the formula:

then the reaction between a polyhydric alcohol and diglycollic acid will result in a compound which may be indicated by the following formula:

where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, then, examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

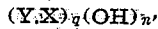
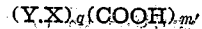
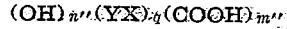

in which $q$ indicates a small whole number (one in the case of a monomer, and probably not over 10, and usually less than 6), and $m'$ and $n'$ indicate the number 1 or more, and $m''$ and $n''$ indicate a small or moderately-sized whole number, such as 0, 1 or more, but in any event, probably a number not in excess of 10. Actually, the preferable type of reagent would be more apt to contain less than 20, and in fact, less than 10 free hydroxyl radicals. It is not necessary to remark that residual carboxyl radicals can be permitted to remain as such, or can be converted in any suitable manner into an ester. Conversion into the ester would be by means of a monohydric alcohol, such as methyl alcohol, ethyl alcohol, propyl alcohol, butyl alcohol, hexyl alcohol, etc.

For practical purposes, however, we have found that the most desirable products are obtained by combinations, in which the ratio of the alcoholic reactant to the acid is within the ratio of 3 to 1 and 1 to 5, and in which the molecular weight of the resultant product does not exceed 10,000 and is usually less than 5,000 and preferably less than 3,000. This is particularly true if the resultant product is soluble to a fairly definite extent, for instance, at least 5% in some solvent, such as water, alcohol, benzene, dichloroethyl ether, acetone, cresylic acid, or the like. This is simply another way of stating that it is preferable that the product be of the sub-resinous type, which is commonly referred to as an A resin or a B resin, as distinguished from a C resin which is a highly infusible, insoluble resin (see Ellis, Chemistry of Synthetic Resins (1935), pages 862, et seq.).

In recapitulating what has been said previously, the sub-resinous, semi-resinous, or resinous product herein contemplated may be indicated by the following formula:

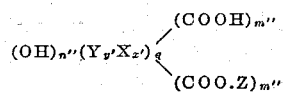

in which the characters have their previous significance, and $y'$ represents a small whole number not greater than 3, and $x'$ represents a small whole number not greater than 5, $q$ is a small whole number less than 10, and preferably 1 to 5; or an organic radical derived from a monohydric alcohol.

Sub-resinous materials having the repetitious unit appearing 3 to 10 times and having a plurality of free carboxyl radicals, or free hydroxyl radicals, or both, are well known in a variety of forms and find practical application in demulsification of crude emulsions. Generally speaking, the molecular weight of such sub-resinous materials, regardless of class, is less than 10,000, and is more apt to be in a range of 3 to 5,000 as an upper limit.

A more elaborate description of this type of material appears in numerous patents concerned with demulsification of crude oil emulsions, and reference is made to such patents for a more elaborate description:

Attention is directed to our co-pending applications Serial Nos. 604,993, 604,994, 604,995, 604,996, 604,998, 604,999, 605,000, 605,001 and 605,002 filed July 13, 1945, all of which are related to the present application, in that such co-pending applications are concerned, among other things, with the breaking of oil field emulsions by means of demulsifiers containing a diglycollic acid radical.

Some of the acylated amino bodies contemplated for use in our process are freely dispersible in water in the free state. Presumably, such systems comprise the reagent in the form of a base, i. e., a substituted ammonium compound. In other instances, the free forms of the reagents are substantially water-insoluble, but the salt forms (e. g., the acetates) are very water-dispersible. In some such instances, therefore, it is more desirable to employ the reagent in the form of one of its salts. We have found, for example, that the acetate, hydroxyacetate, lactate, gluconate, propionate, caprate, phthalate, fumarate, maleate, benzoate, succinate, oxalate, tartrate, chloride, nitrate, or sulfate, prepared by the addition of the suitable acid to the acylated amino body, constitutes a reagent which is usually somewhat more soluble or dispersible in water than the original acylated amino body, and which is, if anything, slightly more effective than the simple acylated amino body, when used in our process. In such instances where the simple acylated amino body is not particularly water-dispersible, it may still be possible to employ it in free form and without preparing a salt form, by using some non-aqueous solvent, such as aromatic petroleum solvent instead of water. It is to be understood that references to the reagents in these specifications and claims include the amino bodies in basic form and in the form of salts of acids, as well as the amino bodies themselves.

Attention is directed to the fact that blown oils derived from higher fatty acids or higher fatty acid glycerides, and particularly blown castor oil, may be employed as a source of a detergent-forming monocarboxy acid acyl radical or acyloxy radical in the preparation of the herein contemplated compounds. In innumerable instances the replacement of castor oil or an analogous ester or ricinoleic acid by the drastically-oxidized or blown product gives a compound which is particularly valuable as a demulsifying agent for petroleum emulsions. This applies with equal force and effect to blown dehydrated castor oil and its analogs in the form of the corresponding acids or other esters.

The new chemical products or compounds herein described form the subject-matter of our divisional application Serial No. 707,982, filed November 5, 1946.

Having thus described our invention, what we claim as new and desire to secure by Letters Patent is:

1. A process for breaking petroleum emulsions of the water-in-oil type, characterized by subjecting the emulsion to the action of the esterification product of (A) a hydroxylated basic tertiary amine; and (B) the resultant obtained by esterification between diglycollic acid and a basic acylated aminoalcohol in which there is at least one occurrence of the radical

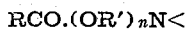

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said aminoalcohol in monomeric form being at least 243 and not over 4,000, and the molecular weight of the diglycollic acid ester being not in excess of 5,000; the ratio of A to B being stoichiometrically less than required for complete esterification of all free diglycollic acid radicals.

2. A process for breaking petroleum emulsions of the water-in-oil type, characterized by subjecting the emulsion to the esterification product of (A) a hydroxylated basic tertiary amine; and (B) the polymeric resultant obtained by esterification between diglycollic acid and a basic acylated aminoalcohol in which there is at least one occurrence of the radical

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said aminoalcohol in monomeric form beign at least 243 and not over 1,000, and the molecular weight of the diglycollic acid ester being not in excess of 5,000; the ratio of A to B being stoichiometrically less than required for complete esterification of all free diglycollic acid radicals.

3. A process for breaking petroleum emulsions of the water-in-oil type, characterized by subjecting the emulsion to the action of the esterification product of (A) a polyhydroxylated basic tertiary amine; and (B) the polymeric resultant obtained by esterification between diglycollic acid and a basic acylated aminoalcohol in which there is at least one occurrence of the radical RCO.(OR')$_n$N< in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said aminoalcohol in monomeric form being at least 243 and not over 1,000, and the molecular weight of the diglycollic acid ester being not in excess of 5,000; the ratio of A to B being stoichiometrically less than required for complete esterification of all free diglycollic acid radicals.

4. A process for breaking petroleum emulsions of the water-in-oil type, characterized by subjecting the emulsion to the action of the esterification product of (A) a polyhydroxylated basic tertiary monoamine; and (B) the polymeric resultant obtained by esterification between diglycollic acid and a basic acylated aminoalcohol, in which there is at least one occurrence of the radical RCO.(OR')$_n$N< in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said aminoalcohol in monomeric form being at least 243 and not over 1,000, and the molecular weight of the diglycollic acid ester being not in excess of 5,000; the ratio of A to B being stoichiometrically less than required for complete esterification of all free diglycollic acid radicals.

5. A process for breaking petroleum emulsions of the water-in-oil type, characterized by subjecting the emulsion to the action of the esterification product of (A) triethanolamine; and (B) the polymeric resultant obtained by esterification between diglycollic acid and a basic acylated aminoalcohol, in which there is at least one occurrence of the radical RCO.(OR')$_n$N< in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from 1 to 10; and the molecular weight of said aminoalcohol in monomeric form being at least 243 and not over 1,000, and the molecular weight of the diglycollic acid ester being not in excess of 5,000; the ratio of A to B being stoichiometrically less than required for complete esterification of all free diglycollic acid radicals.

6. The process of claim 5, wherein RCO is the acyl radical of a higher fatty acid.

7. The process of claim 5, wherein RCO is the acyl radical of an unsaturated higher fatty acid.

8. The process of claim 5, wherein RCO is the ricinoleyl radical.

9. The process of claim 6, wherein RCO is the ricinoleyl radical and R' is an ethylene radical.

10. A process for breaking petroleum emulsions of the water-in-oil type, characterized by subjecting the emulsion to the action of the esterification product of triethanolamine and a polymeric resultant obtained in turn by esterification between diglycollic acid and a basic acylated aminoalcohol; said basic acylated aminoalcohol being an intermediate obtained by esterification reaction between one mole of triricinolein and approximately 3 moles of triethanolamine; the ratio of triethanolamine to the diglycollic acid derivative being stoichiometrically less than required for complete esterification of all free diglycollic acid radicals.

11. A process for breaking petroleum emulsions of the water-in-oil type, characterized by subjecting the emulsion to the action of the esterification product of triethanolamine and a polymeric resultant obtained in turn by esterification between diglycollic acid and a basic acylated aminoalcohol; said basic acylated aminoalcohol being an intermediate obtained by esterification and etherification reactions between one mole of triricinolein and approximately 6 moles of triethanolamine; the ratio of triethanolamine to the diglycollic acid derivative being stoichiometrically less than required for complete esterification of all free diglycollic acid radicals.

12. A process for breaking petroleum emulsions of the water-in-oil type, characterized by subjecting the emulsion to the action of the esterification product of triethanolamine and a polymeric resultant obtained in turn by esterification between diglycollic acid and a basic acylated aminoalcohol; said basic acylated aminoalcohol being an intermediate obtained by esterification and etherification reactions between one mole of triricinolein and approximately 9 moles of triethanolamine; the ratio of triethanolamine to the diglycollic acid derivative being stoichiometrically less than required for complete esterification of all free diglycollic acid radicals.

MELVIN DE GROOTE.
ARTHUR F. WIRTEL.

REFERENCES CITED

The following references are of record in the file of this patent:

UNITED STATES PATENTS

| Number | Name | Date |
| --- | --- | --- |
| 2,192,993 | De Groote et al. | Mar. 12, 1940 |
| 2,231,758 | De Groote et al. | Feb. 11, 1941 |
| 2,372,797 | Segessemann | Apr. 3, 1945 |
| 2,385,969 | De Groote et al. | Oct. 2, 1945 |